(12) United States Patent
Xu

(10) Patent No.: US 9,981,549 B2
(45) Date of Patent: May 29, 2018

(54) SPLASH RESISTANT OIL TANK FILL TUBE

(71) Applicant: United Technologies Corporation, Hartford, CT (US)

(72) Inventor: Jinquan Xu, East Greenwich, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 254 days.

(21) Appl. No.: 14/615,790

(22) Filed: Feb. 6, 2015

(65) Prior Publication Data

US 2016/0229287 A1    Aug. 11, 2016

(51) Int. Cl.
| | |
|---|---|
| *B60K 15/04* | (2006.01) |
| *F01M 11/00* | (2006.01) |
| *F01D 25/18* | (2006.01) |
| *B67D 7/42* | (2010.01) |
| *B67D 7/04* | (2010.01) |
| *B60K 15/03* | (2006.01) |
| *F01M 11/04* | (2006.01) |

(52) U.S. Cl.
CPC ............ *B60K 15/0406* (2013.01); *B67D 7/04* (2013.01); *B67D 7/42* (2013.01); *F01D 25/18* (2013.01); *F01M 11/04* (2013.01); *B60K 2015/0344* (2013.01); *B60K 2015/03269* (2013.01)

(58) Field of Classification Search
CPC .......... F01D 25/18; F01M 11/04; B67D 7/42; B67D 7/04; B60K 2015/03269; B60K 2015/0344; B01F 5/0641

USPC .......... 220/86.2; 141/286; 366/337; 33/726, 33/722, 730, 731
See application file for complete search history.

(56) References Cited

U.S. PATENT DOCUMENTS

| | | | | |
|---|---|---|---|---|
| 1,280,027 A | * | 9/1918 | Kurtz ...................... | A41B 9/08 2/78.2 |
| 1,496,896 A | * | 6/1924 | Laffoon .................... | B02B 1/04 366/337 |
| 1,862,016 A | * | 6/1932 | Houck ............... | B60K 15/0403 220/86.3 |
| 1,914,464 A | * | 6/1933 | Simpson ................ | B61D 5/008 220/86.1 |

(Continued)

FOREIGN PATENT DOCUMENTS

| | | |
|---|---|---|
| CN | 202782671 U  * | 3/2013 |
| EP | 0917903 | 5/1999 |

(Continued)

OTHER PUBLICATIONS

Extended European Search Report dated Jul. 21, 2016 in European Application No. 16154549.6.

*Primary Examiner* — Jason K Niesz
*Assistant Examiner* — James Hakomaki
(74) *Attorney, Agent, or Firm* — Snell & Wilmer, L.L.P.

(57) ABSTRACT

A fill tube for an oil tank may have at least one baffle coupled to an inner wall of the fill tube. A first baffle may have an aperture. A release tube may be coupled to the baffle at the aperture. An object may be inserted through the aperture. The object may force open a flapper valve coupled to the fill tube. Pressure in the oil tank may be released through the flapper valve. The baffles may prevent hot oil from spraying out of the fill tube. After the pressure has been equalized, oil may be poured into the fill tube to fill the oil tank.

8 Claims, 5 Drawing Sheets

(56) References Cited

U.S. PATENT DOCUMENTS

| | | | | |
|---|---|---|---|---|
| 2,918,192 A * | 12/1959 | Dedman | ............ | B60K 15/0406 220/374 |
| 3,128,899 A * | 4/1964 | Runo | ...................... | F16K 24/04 220/374 |
| 3,580,414 A * | 5/1971 | Ginsburgh | ............ | B60K 15/04 220/86.2 |
| 3,926,290 A * | 12/1975 | Isojima | ................... | B63B 27/28 193/27 |
| 4,031,294 A * | 6/1977 | Sano | ................... | H01M 2/1252 429/82 |
| 4,127,216 A * | 11/1978 | Martin, Jr. | ............. | B65D 90/10 220/259.1 |
| 4,327,783 A * | 5/1982 | Kanno | ................... | B60K 15/04 141/349 |
| 4,476,670 A * | 10/1984 | Ukai | ..................... | A01D 46/243 193/25 R |
| 4,848,602 A * | 7/1989 | Yoshimura | ................ | A45F 3/16 141/286 |
| 4,966,299 A * | 10/1990 | Teets | ...................... | B60K 15/04 123/516 |
| 5,042,678 A * | 8/1991 | Munguia | ................ | B60K 15/04 137/199 |
| 5,544,419 A * | 8/1996 | Smeltzer | ................. | G01F 23/04 33/722 |
| 6,189,581 B1 * | 2/2001 | Harris | .................... | B60K 15/04 137/588 |
| 6,340,093 B1 * | 1/2002 | Zapp | ...................... | B60K 15/04 220/86.1 |
| 6,691,750 B1 * | 2/2004 | Foltz | ..................... | B60K 15/04 141/348 |
| 2006/0021670 A1 * | 2/2006 | Baber | .................... | B65G 69/16 141/2 |
| 2009/0101230 A1 * | 4/2009 | Anstead | .................. | F01D 25/00 141/326 |
| 2011/0079322 A1 * | 4/2011 | Beier | ................. | B60K 15/0406 141/350 |
| 2011/0305104 A1 * | 12/2011 | McGuire | ............... | B01F 5/0619 366/337 |
| 2015/0028031 A1 | 1/2015 | Scholz | | |
| 2015/0291407 A1 * | 10/2015 | Fox | ........................ | B67C 11/02 141/339 |

FOREIGN PATENT DOCUMENTS

| | | |
|---|---|---|
| EP | 1297984 | 4/2003 |
| EP | 1921284 | 5/2008 |
| FR | 2633007 | 12/1989 |
| JP | S619510 | 1/1986 |
| JP | S61113911 | 7/1986 |
| JP | 2009078648 A * | 4/2009 |

* cited by examiner

SPLASH RESISTANT OIL TANK FILL TUBE

FIELD

The disclosure relates generally to gas turbine engines, and more particularly to oil tank fill tubes in gas turbine engines.

BACKGROUND

Gas turbine engines typically comprise an oil tank which holds oil to be used for various purposes, such as for lubrication of various components. During engine operation, temperatures and pressures in the oil tank may rise. A breather line may bleed off excess air pressure in the oil tank. However, the breather line may at times become inefficient. The oil tank may include a fill tube. A cap may be attached to a fill port of the fill tube. A flapper valve may seal a bottom end of the fill tube. The flapper valve may seal the fill tube closed due to a pressure differential between the oil tank and the ambient pressure. When the flapper valve is sealed closed, oil poured down the fill tube may not enter the oil tank through the flapper valve. In the past, mechanics have inserted an object, such as a screwdriver, through the fill tube to force the flapper valve open to release pressure in the oil tank. However, the rapid release of pressure may cause scalding oil to spray out the fill tube.

SUMMARY

An oil system for a gas turbine engine may comprise an oil tank, a fill tube, a cap, a flapper valve, a first baffle, and a second baffle. The fill tube may be coupled to the oil tank. The cap may be coupled to a first end of the fill tube. The flapper valve may be coupled to the fill tube. The first baffle may be coupled to an inner wall of the fill tube. The first baffle may comprise a first aperture. The second baffle may be coupled to the inner wall of the fill tube.

In various embodiments, the oil system may comprise a release opening coupled to the first baffle. The first baffle and the second baffle may overlap. A third baffle may be coupled to the inner wall. A first release opening may be coupled to the first baffle, and a second release opening may be coupled to the third baffle. The release opening may be a release tube. The flapper valve may be biased to seal with the fill tube.

A fill tube for an oil tank may comprise a cap coupled to a first end of the fill tube, a flapper valve coupled to the fill tube, and a first baffle coupled to an inner wall of the fill tube.

In various embodiments, a first release opening may be coupled to the first baffle. A second baffle may be coupled to the inner wall of the fill tube. A first release opening may be coupled to the first baffle, and a second release opening may be coupled to the second baffle. The first release opening and the second release opening may be aligned. The first baffle may be configured to deflect oil from exiting the fill tube. The first baffle may comprise a circular disk with a truncated side.

A method of filling an oil tank may comprise opening a cap coupled to a fill tube, inserting an object through an aperture in a first baffle in the fill tube, and pushing open a flapper valve with the object.

In various embodiments, the method may comprise inserting the object through an aperture in a second baffle in the fill tube. The pressure in the oil tank may be released through the flapper valve. The object may be a screwdriver. Oil may be poured into the fill tube. The oil may flow through the aperture in the first baffle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
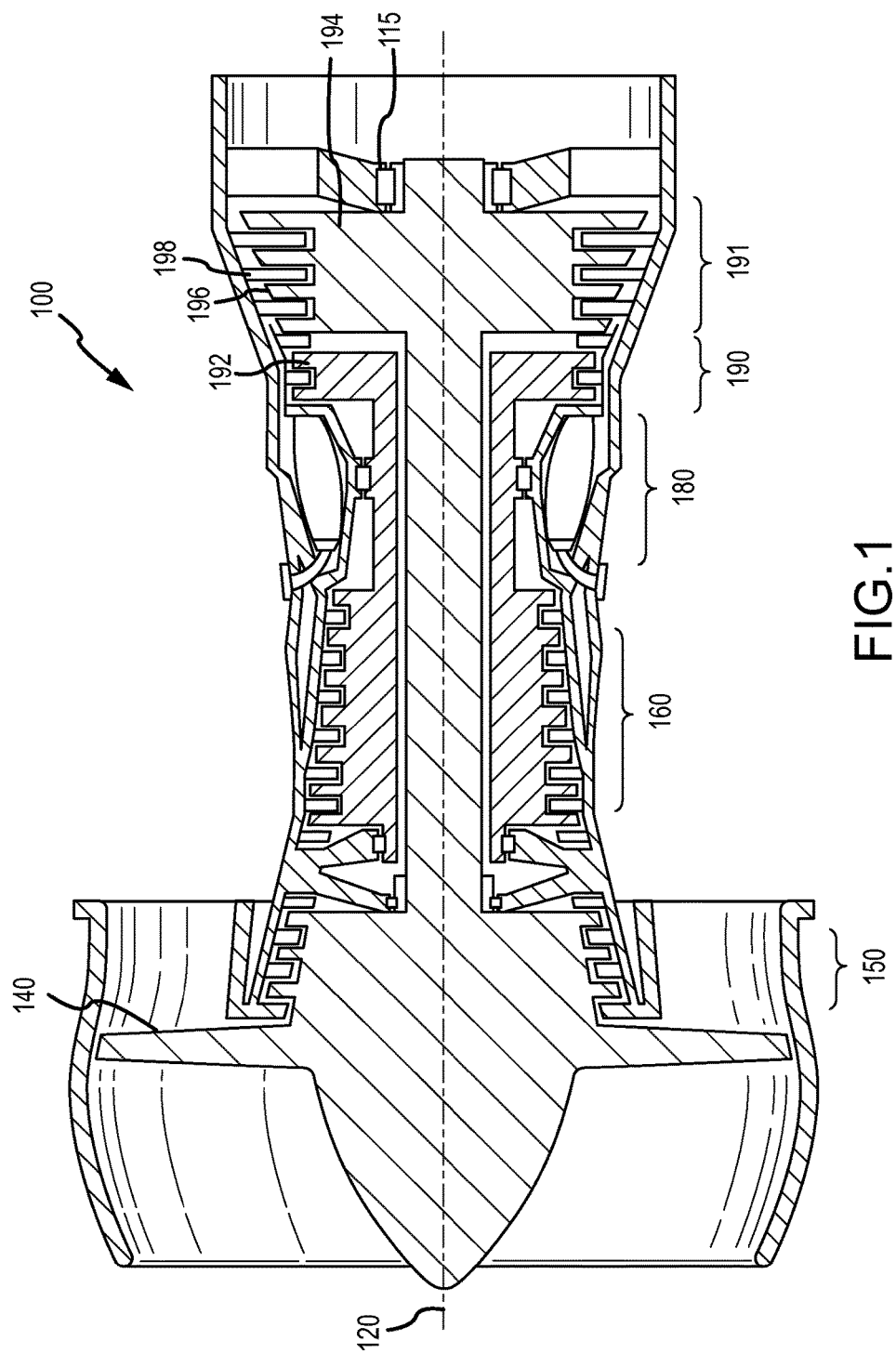
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
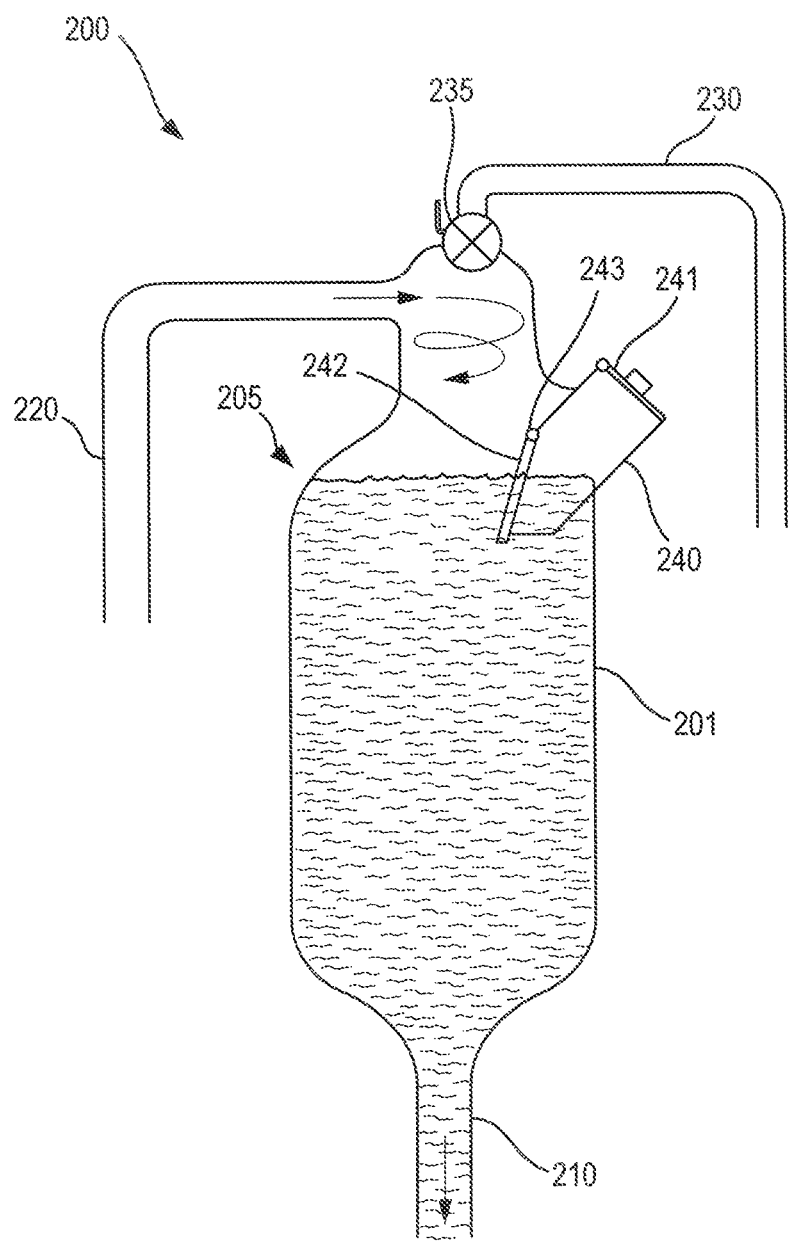
FIG. 2 illustrates a schematic cross-section view of an oil system in accordance with various embodiments.

Referring to FIG. 2, a schematic view of an oil system 200 is illustrated according to various embodiments. The oil system 200 may comprise an oil tank 201. The oil tank 201 may be an oil tank for a gas turbine engine. However, the concepts disclosed herein extend to any fluid tank which is subject to pressures greater than ambient pressure. The oil tank 201 may supply oil to an engine through supply line 210. The oil may be used for various purposes, such as to lubricate, cool, and clean the engine main bearings, gears, and accessory drives. The oil may also be used to heat engine fuel to prevent ice in the fuel.

An oil and air mixture may return to the oil tank 201 through a scavenge return line 220. The oil and air may reach temperatures of up to 300° C. (570° F.) or greater. The oil may be heated by friction between engine components or from hot air in the engine. The increase in temperature may increase pressure in the oil tank 201. Additionally, an oil pump may increase pressure in the oil tank 201.

A breather line 230 may remove excess pressure from the oil tank 201. A breather valve 235 may be located in the breather line 230 to control the removal of excess pressure and prevent backflow from the breather line 230 into the oil tank 201.

The oil tank 201 may comprise a fill tube 240. Oil may be added to the oil tank 201 by pouring oil into the fill tube 240. A cap 241 may seal an upper end of the fill tube 240. The cap 241 may be coupled to the fill tube 240 by any method known in the art, such as screwed, snapped, hinged, etc.

The fill tube 240 may be sealed at the bottom end by a flapper valve 242. The flapper valve 242 may be located at least partially above the oil level 205 in the oil tank 201, and at least partially below the oil level 205 in the oil tank 201. The flapper valve 242 may be hinged to the fill tube 240 by a hinge 243. In various embodiments, the flapper valve 242 may be biased to be closed by a spring. However, in various embodiments, the flapper valve 242 may not be biased in any direction, and the flapper valve 242 may seal the fill tube 240 in response to the pressure in the oil tank 201 exceeding the pressure in the fill tube 240.

Oil may be poured into the fill tube 240 to add oil to the oil tank 201. In the absence of a large pressure differential between the oil tank 201 and the fill tube 240, the weight of the oil poured into the fill tube 240 may force the flapper valve 242 open, and the oil may flow into the oil tank 201.

However, in some cases, such as in the event of an inefficiency in the breather line 230 or the breather valve 235, the pressure in the oil tank 201 may be much greater than the pressure in the fill tube 240. In such cases, the weight of oil poured into the fill tube 240 may be insufficient to overcome the pressure differential and open the flapper valve 242. In order to allow the oil to enter the oil tank 201 a mechanic may manually release the pressure in the oil tank 201. One method previously used is for the mechanic to physically force open the flapper valve 242. The mechanic may insert an object into the fill tube 240, such as a screwdriver. The mechanic may push against the flapper valve 242 with the object, causing the flapper valve 242 to open. As the flapper valve 242 opens, the pressurized air in the oil tank 201 may rush through the flapper valve 242 and out the fill tube 240. The pressure release may also cause hot oil in the oil tank 201 to spray out the fill tube 240.

Figure 3:
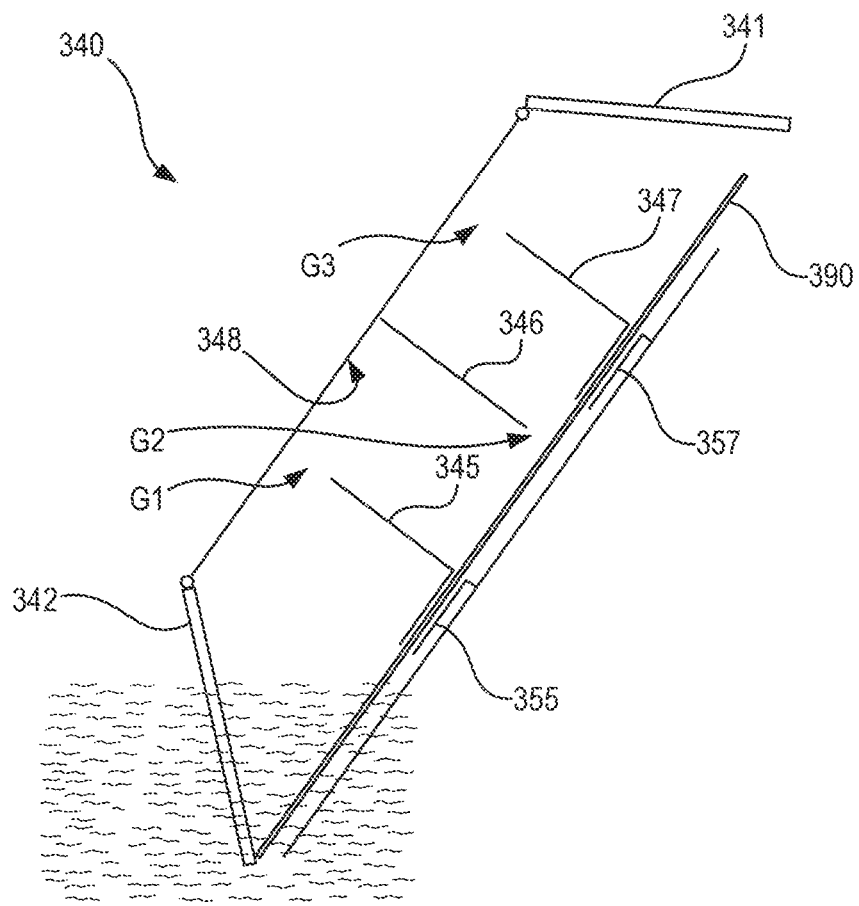
FIG. 3 illustrates a schematic cross-section view of a fill tube in accordance with various embodiments.

Referring to FIG. 3, a cross-section view of a fill tube 340 having baffles is illustrated according to various embodiments. The fill tube 340 may comprise a cap 341 and a flapper valve 342, as previously described with reference to FIG. 2. The fill tube 340 may further comprise a first baffle 345, a second baffle 346, and a third baffle 347. However, in various embodiments, the fill tube 340 may comprise two baffles, or any number of baffles. The baffles 345, 346, 347 may be cantilevered from inner wall 348 of fill tube 340. In various embodiments, the baffles 345, 346, 347 may be welded to the inner wall 348. However, the baffles 345, 346, 347 may be co-molded with or coupled to the inner wall 348 by any other suitable method. The baffles 345, 346, 347 may prevent oil from splashing out of the fill tube 340. The baffles 345, 346, 347 may overlap such that there is no unblocked line of sight between the flapper valve 342 and the cap 341, with the exception of release openings, such as apertures or release tubes 355, 357.

The first baffle 345 and the third baffle 347 may each comprise a release tube 355, 357 respectively. The first release tube 355 and the second release tube 357 may be aligned, such that a straight object 390 (e.g. a screwdriver) inserted through the first release tube 355 may also be inserted through the second release tube 357. The object 390 may be inserted through the release tubes 355 and 357, and the object 390 may contact and force open the flapper valve 342.

Once the flapper valve 342 is forced open, pressurized air may release through the flapper valve 342 and out the fill tube 340. The pressurized air may flow around the baffles 345, 346, 347 in gaps G1, G2, G3 between the baffles 345, 346, and 347 and the inner wall 348. A small amount of air may flow through the release tubes 355, 357. However, the release tubes 355, 357 may be sized such that the object 390 substantially fills the release tubes 355, 357 and blocks any air or oil from exiting the fill tube 340 through the release tubes 355, 357. Oil which splashes up the fill tube 340 may contact at least one of the baffles 345, 346, 347 and be prevented from exiting the fill tube 340.

After the pressure has been equalized between the oil tank and the ambient pressure in the fill tube 340, the object 390 may be removed, and oil may be poured into the fill tube 340. The oil may flow through the release tubes 355, 357 and/or through the gaps G1, G2, G3. The weight of the oil may force and maintain the flapper valve 342 open, and the oil tank may be filled to the desired level.

Figure 4A:
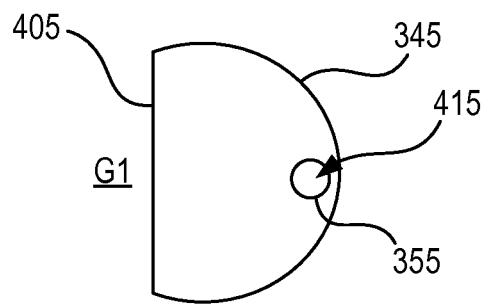
FIGS. 4A-4C illustrate top views of fill tube baffles in accordance with various embodiments.
Figure 4B:
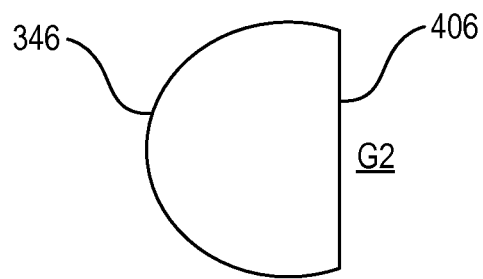
Figure 4C:
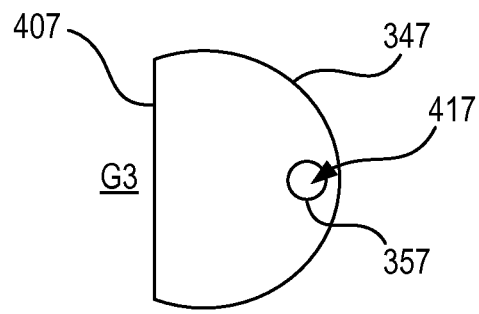

Referring to FIGS. 4A, 4B, and 4C, a top view of the first baffle 345, the second baffle 346, and the third baffle 347, respectively, are illustrated according to various embodiments. The baffles 345, 346, 347 may be generally circular disks with a truncated side 405, 406, 407. As used herein, a circular disk with a truncated side refers to a disk excluding a segment, such as the gaps G1, G2, G3. The first baffle 345 and the third baffle 347 may comprise apertures 415, 417.

The apertures 415, 417 may allow an object to be inserted through the release tubes 355, 357 to open the flapper valve.

Figure 5:
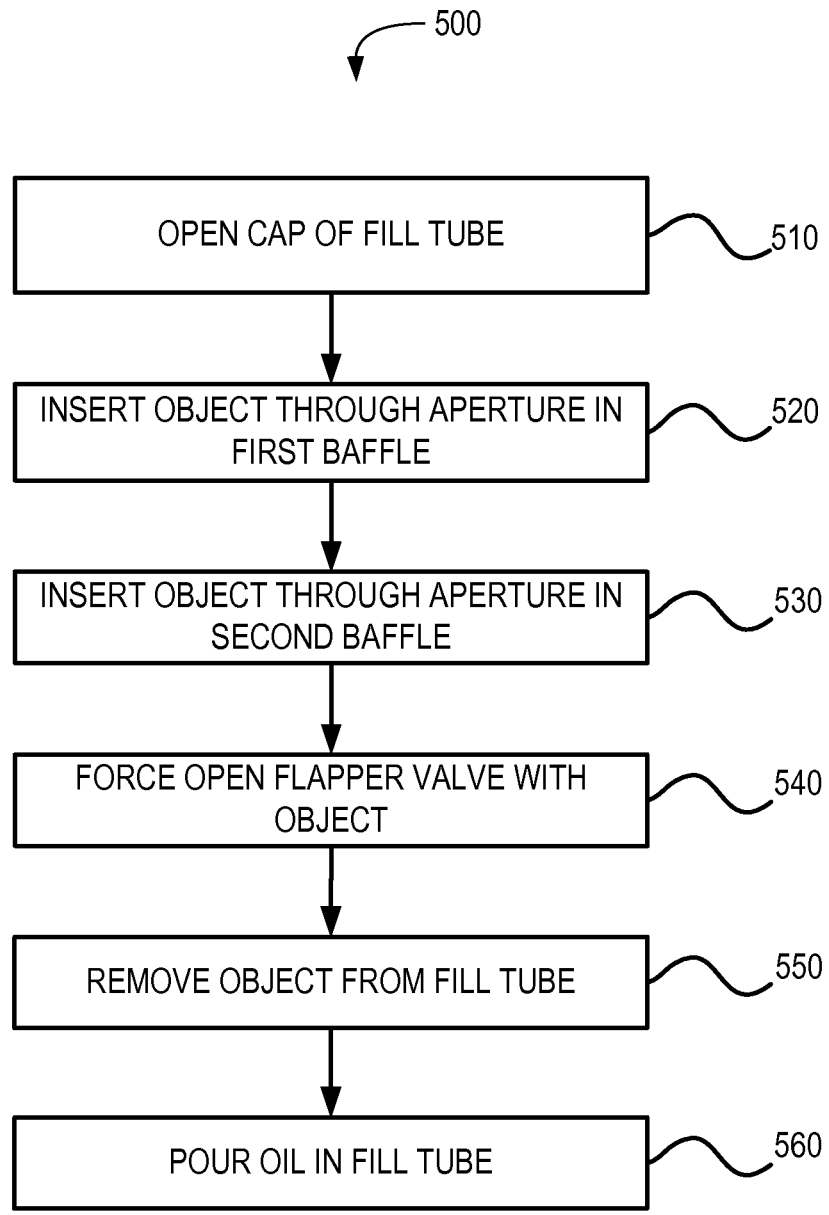
FIG. 5 illustrates a process for filling an oil tank in accordance with various embodiments.

Referring to FIG. 5, a flowchart 500 of a process for filling an oil tank is illustrated according to various embodiments. A cap of a fill tube may be opened (step 510). An object may be inserted through an aperture in a first baffle in the fill tube (step 520). In various embodiments, the object may be a screwdriver or any other object having a straight rod. The object may be inserted through an aperture in a second baffle (step 530). However, in various embodiments, such as where the fill tube comprises only two baffles, the object is only inserted through an aperture in one baffle. The object may force open a flapper valve (step 540). Pressure may be released from the oil tank through the flapper valve and out the fill tube. The object may be removed from the fill tube (step 550). Oil may be poured into the fill tube (step 560). The weight of the oil may force open the flapper valve, and the oil tank may be filled to the desired level.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An oil system for a gas turbine engine comprising:
an oil tank;
a fill tube coupled to the oil tank;
a cap coupled to a first end of the fill tube;
a flapper valve coupled to the fill tube;
a first baffle coupled to an inner wall of the fill tube, wherein the first baffle comprises a first aperture, wherein the first baffle comprises a first circular disk having a first truncated side;
a first release tube coupled to the first baffle;
a second baffle coupled to the inner wall of the fill tube, wherein the second baffle comprises a second circular disk having a second truncated side; and
a second release tube coupled to the second baffle, wherein the first release tube and the second release tube are aligned.

2. The oil system of claim 1, further comprising a release opening coupled to the first baffle.

3. The oil system of claim 1, wherein the first baffle and the second baffle overlap.

4. The oil system of claim 1, further comprising a third baffle coupled to the inner wall.

5. The oil system of claim 4, further comprising a first release opening coupled to the first baffle, and a second release opening coupled to the third baffle.

6. The oil system of claim 2, wherein the release opening is the release tube.

7. The oil system of claim 1, wherein the flapper valve is biased to seal with the fill tube.

8. A method of filling an oil tank comprising:
opening a cap coupled to a fill tube;
inserting an object through an aperture in a first baffle in the fill tube;
inserting the object through a first release tube coupled to the first baffle;
inserting the object through a second release tube coupled to a second baffle, wherein the second release tube is aligned with the first release tube;
pushing open a flapper valve with the object;
wherein the pushing open the flapper valve releases pressurized air from within the oil tank;
removing the object from the fill tube; and
pouring oil into the oil tank with the object removed from the fill tube.

* * * * *